Dec. 9, 1947.                E. N. MEAKIN                2,432,326
                              PELLET MILL
                        Filed Oct. 13, 1944          2 Sheets-Sheet 2
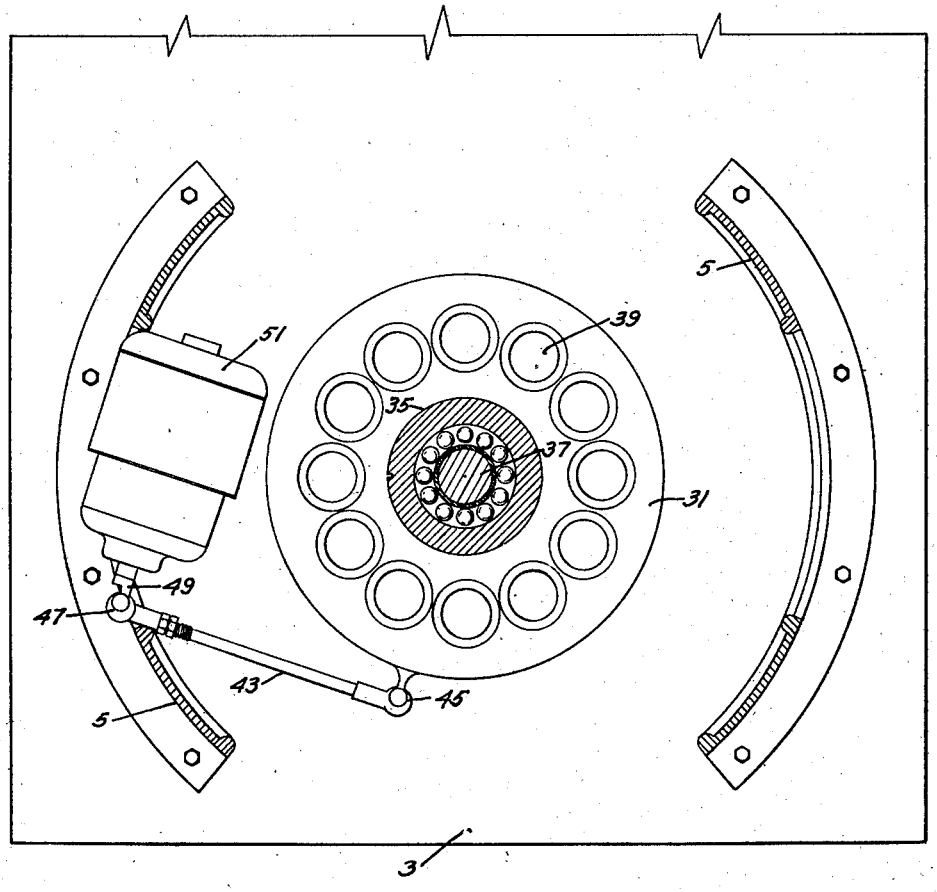
INVENTOR.
EDGAR N. MEAKIN
BY
ATTORNEY Patented Dec. 9, 1947

2,432,326

UNITED STATES PATENT OFFICE 2,432,326

PELLET MILL

Edgar N. Meakin, San Francisco, Calif.

Application October 13, 1944, Serial No. 558,529

8 Claims. (Cl. 107—14)

My invention relates to pellet mills and more particularly to that portion of such mills in which the pellets are formed.

In mills commonly employed for the compaction of material, such as meal, chemicals, etc., into pellet form, the material is extruded through openings in a die, and emerges from such openings in the form of rods of such material in compacted form. Where the rods are of small cross-section and small pellets are desired, as in the preparation of chicken feed, a severing knife may be mounted with the cutting edge adjacent the discharge surface of the die, in a position to sever such rods as they approach the knife. In the case of small pellets, the desired length is reached within a single revolution of the die relative to the extruding member.

In the formation of pellets of greater length and size, as for example, in the preparation of cattle feed, more than one revolution of the die relative to the extrusion member is required in order to build up the extruded rod to the proper length suitable for severance. In such cases, severance of the rod cannot be accomplished, as in the previous manner through the use of a severing knife, for such rods would all be severed during the first revolution of the die, and would never have an opportunity to reach their proper length.

In accordance with present practice, therefore, it is customary to provide a breaker bar supported across the die, in a direction normal to the path of relative movement of the pellet rods and in spaced relationship to the discharge side of the die, such spaced relationship being sufficient to break off pellets when the pellet rods have reached proper length. This type of breaker bar, however, produces its results through striking the pellet rods a sharp blow as the two come together, and in many instances, such sudden blow produces a fracture of the rods at some intermediate point instead of at the base thereof. This may possibly be attributed to the fact that the stresses set up therein upon the sudden contact with the breaker bar, become concentrated at some intermediate point of weakness in the rod, instead of at the base where severance is desired.

This situation is additionally aggravated by the fact that the sudden blow of the breaker bar against the pellet rods is along the line of relative movement of such rods, resulting in the pellet rods being driven against the succeeding pellet rods approaching the breaker bar, thereby increasing the tendency for fractures to occur at points other than at the bases of the pellet rods. When such improperly fractured rods again approach the breaker bar for severance, they will then be somewhat in excess of the desired length. Accordingly, the output of present day machines employing breaker bars is not entirely uniform.

Among the objects of my invention are:

(1) To provide a novel and improved means for forming pellets from material extruded through a die;

(2) To provide a novel and improved means for severing die extruded material to form pellets;

(3) To provide a novel and improved means for producing pellets of uniform size and shape;

(4) To provide a novel and improved means for producing pellets of selected length;

(5) To provide a novel and improved means for producing pellets of uniform length, which means shall be simple and rugged in construction, and adjustable for the production of pellets of different lengths.

Additional objects of my invention will be brought out in the following description of a preferred embodiment of the same, taken in conjunction with the accompanying drawings wherein—

Figure 2 is a horizontal view through the mill of Figure 1, taken in the plane 2—2 of Figure 1.

Figure 1:
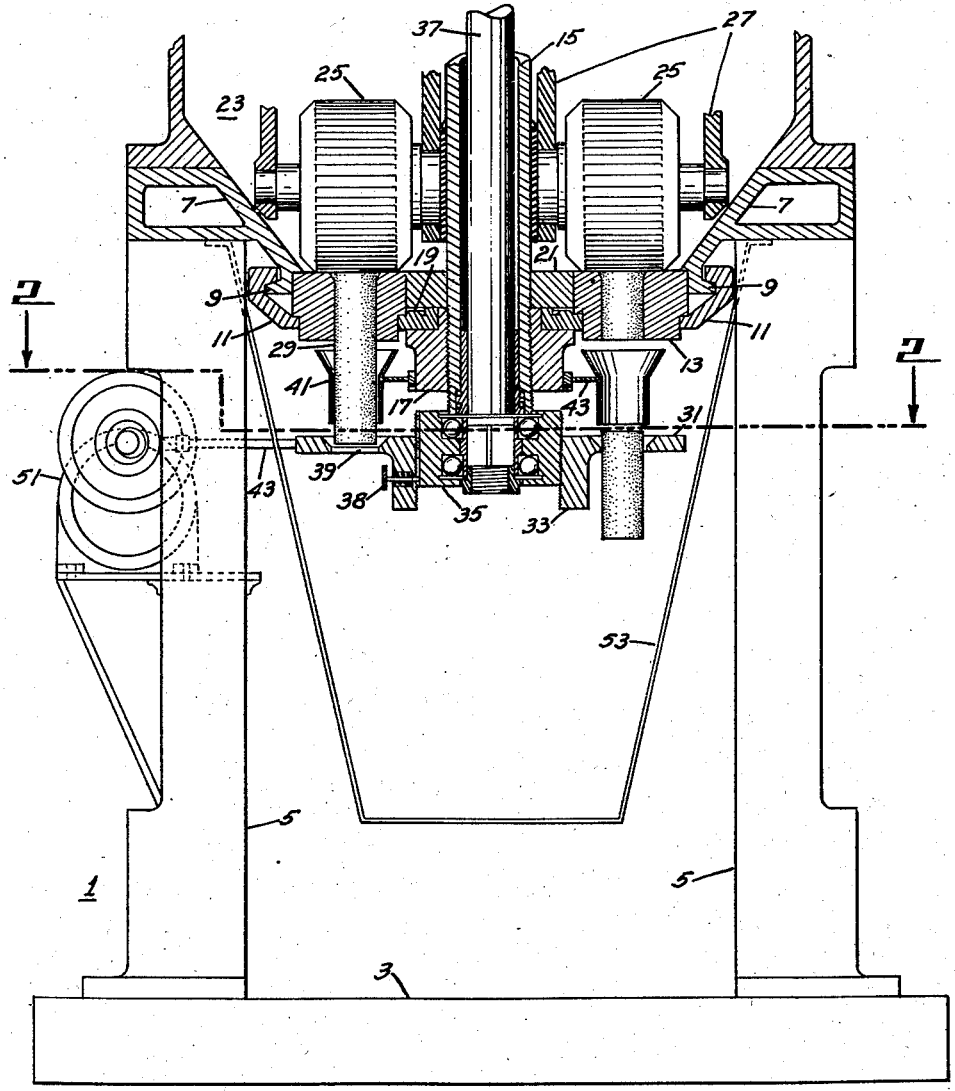
Figure 1 is a fragmentary vertical view, partly in section, of a pellet mill, illustrating the application of my invention thereto in its preferred form.

The mill comprises a base 1 including a platform 3 and a pair of oppositely disposed uprights or standards 5 supporting an inwardly sloping circular bowl 7 having an outturned lower edge 9 from which a die clamp 11 is suspended to engage and support the outer edge of a ring die 13.

A centrally mounted sleeve 15 supported in any conventional manner from the upper portion of the mill (not illustrated), as by a thrust bearing, carries at its lower end, a nut 17 carrying in a peripheral recess, the segments of a split ring 19 which offers support to the inner edge of the ring die.

A die block 21 carried on the nut flush with the compression surface of the die 13, forms with the die, the floor of a compression chamber 23 into which the loose pellet material is fed for extrusion through the die.

Such compression of the pellet material is accomplished through the use of a pair of compression rollers 25 journaled in a spider 27 adapted for rotation about the sleeve as an axis. The upper structure of the mill, which, for simplicity sake, has not been illustrated, may be of any desired construction, but preferably as illustrated in the patent to Edgar T. Meakin, No. 2,065,141, of December 22, 1936, or the patent to Edgar N. Meakin, No. 2,075,450, of March 30, 1937. Such structure, however, is not part of the present invention.

The material, following extrusion, emerges from the discharge side of the die as rods 29 of compacted pellet material.

In its broad aspects, my invention contemplates the use of oscillating means spaced from the discharge side of the die a distance equal to the desired length of pellets, such oscillating means being adapted to engage the compacted rods when they reach the desired length and shake them loose from the die along a plane of fracture substantially coinciding with the discharge surface of the die, to produce pellets of uniform length.

In terms of specific structure, the oscillating means takes the form of a shaker disk 31 having an integral depending skirt 33 internally threaded for enabling the disk to be adjustably mounted on the outer section of a ball race 35 carried on the lower end of a shaft 37 extending axially of the central sleeve. A spring biased pin 38 through the skirt is adapted to engage the outer ball race section and hold the adjusted position of the disk 31.

The shaker disk is provided with countersunk perforations 39 corresponding to and in approximate alignment with the holes in the die. Intermediate each perforation 39 and its corresponding hole in the die, I provide a guide funnel 41 to receive and guide an emerging rod 29 into its associated disk opening 39. These funnels are preferably carried on the edge of the disk 43 surrounding the sleeve nut 17 and affixed thereto.

In performing the guiding function, the funnels 41 discourage the normal tendency of the rods to curve during extrusion, thus maintaining them uniformly straight, and thereby rendering more efficient, the use of the shaker disk in producing pellets of uniform size and shape.

The oscillating movement of the shaker disk 31, essential toward its operation, is imparted thereto through a link 43 connected at one end to the edge of the disk 31 through the medium of a ball and socket joint 45, and at its other end through a ball and socket connection 47 to a crank 49 which may be on the end of a shaft of a motor 51 or mounted on a gear driven from such motor. The throw of the crank need not be large, a matter of a quarter of an inch being sufficient for the purpose.

As the pellets are vibrated loose from the die, they fall into a hopper 53 which may be provided with a discharge spout (not shown) for the filling of bags or the like directly from the mill.

The machine as thus described fulfills all the objects of my invention as previously set forth, and while I have described my invention in its preferred form and in considerable detail, it is apparent that the same may be changed or altered without departing from the principles involved. Thus, the invention may obviously be made applicable to structures wherein a cylindrical die is employed. I, accordingly, do not desire to be limited in my protection to the details set forth and described, except as may be necessitated by the appended claims.

I claim:

1. A pellet mill comprising a die having holes therein through which pellet material may be extruded in the form of rods of compacted material, and shaker means disposed on the discharge side of said die for vibrating such rods independently of said die to effect fracture thereof into pellets.

2. A pellet mill comprising a die having holes therein through which pellet material may be extruded in the form of rods of compacted material, and shaker means disposed on the discharge side of said die for engaging and vibrating such rods when of a predetermined length, to effect fracture thereof into pellets.

3. A pellet mill comprising a die having holes therein through which pellet material may be extruded in the form of rods of compacted material, and shaker means disposed on the discharge side of said die for engaging and vibrating such rods when of a predetermined length, to effect fracture thereof adjacent the discharge surface of said die.

4. A pellet mill comprising a die having holes therein through which pellet material may be extruded in the form of rods of compacted material, and shaker means disposed on the discharge side of said die in spaced relationship thereto for engaging and vibrating such rods individually when of a predetermined length, to effect fracture thereof adjacent the discharge surface of said die.

5. A pellet mill comprising a die having holes therein through which pellet material may be extruded in the form of rods of compacted material, shaker means disposed in spaced relationship to the discharge side of said die and having corresponding holes in substantial alignment with said die holes, and means intermediate said die and said shaker means for guiding such rods into said corresponding holes in said shaker means.

6. A pellet mill comprising a die having holes therein through which pellet material may be extruded in the form of rods of compacted material, shaker means disposed in spaced relationship to the discharge side of said die and having corresponding holes in substantial alignment with said die holes, and guide means including a plurality of funnels intermediate said die and said shaker means for guiding such rods into said corresponding holes in said shaker means.

7. A pellet mill comprising a die having holes therein through which pellet material may be extruded in the form of rods of compacted material; shaker means including a disk disposed in spaced relationship to the discharge side of said die and having corresponding holes in substantial alignment with said die holes, and means for oscillating said disk; and means intermediate said die and said disk for guiding such rods into said corresponding holes in said disk during extrusion of said rods and while said disk is oscillating.

8. A pellet mill comprising a die having holes therein through which pellet material may be extruded in the form of rods of compacted material; shaker means including a disk disposed in adjustable spaced relationship to the discharge side of said die and having corresponding holes in substantial alignment with said die holes, and means for oscillating said disk; and means intermediate said die and said disk for guiding such rods into said corresponding holes in said disk during extrusion of said rods and while said disk is oscillating.

EDGAR N. MEAKIN.

REFERENCES CITED

The following references are of record in the file of this patent:

UNITED STATES PATENTS

| Number | Name | Date |
|---|---|---|
| 2,371,678 | Crosser | Mar. 20, 1945 |
| 2,252,900 | Shafer | Aug. 19, 1941 |
| 2,149,920 | Kretchmer | Mar. 7, 1939 |
| 1,487,323 | Fontana | Mar. 18, 1924 |